B. M. HENLEY.
ICE SCALE FOR REFRIGERATORS.
APPLICATION FILED AUG. 4, 1914.
1,139,522.  Patented May 18, 1915.
2 SHEETS—SHEET 2.
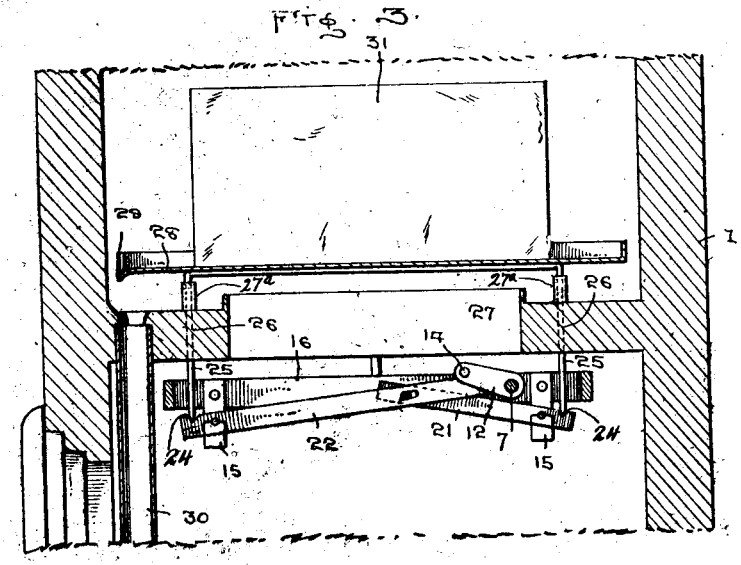
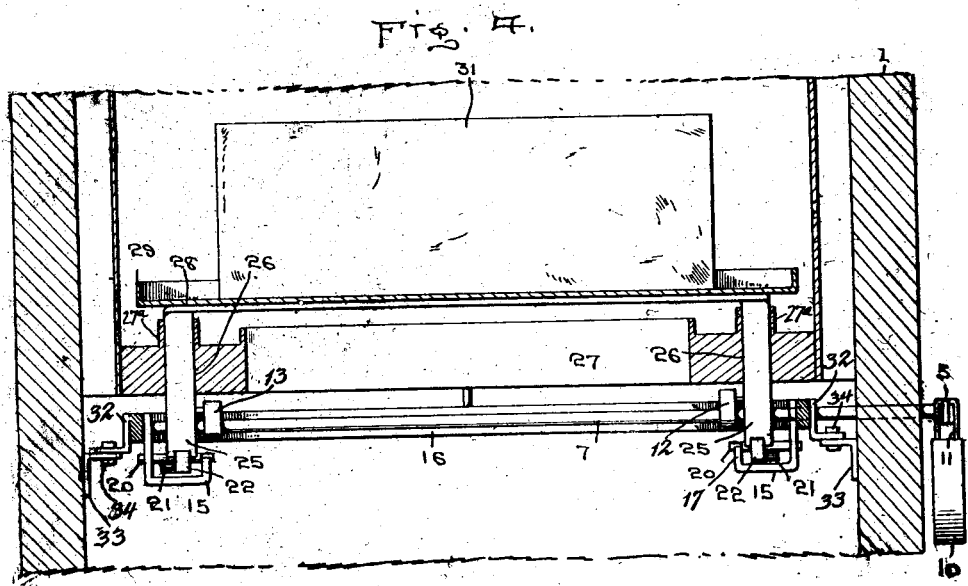
Witnesses:
Inventor
B. M. Henley
By W. J. FitzGerald & Co.
Attorneys

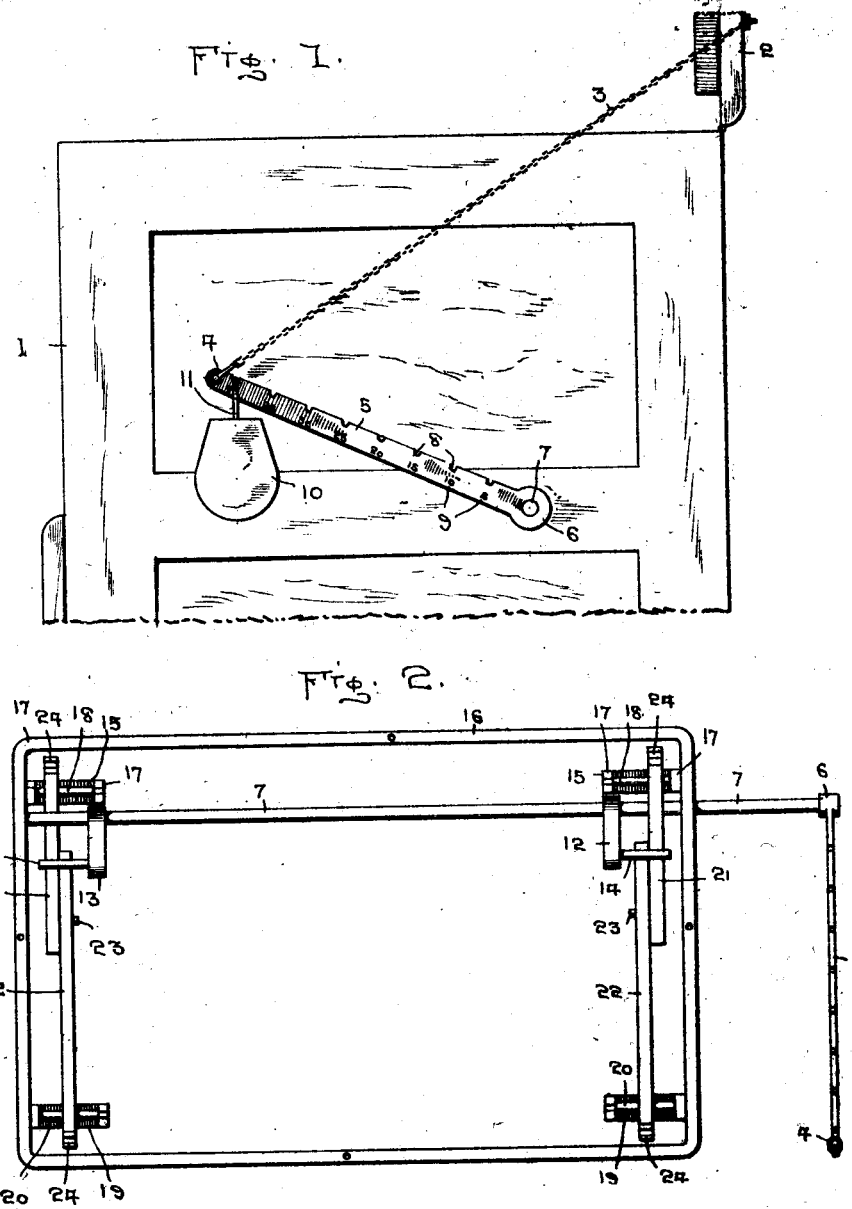

UNITED STATES PATENT OFFICE.

BERTIE M. HENLEY, OF GEDDES, SOUTH DAKOTA.

ICE-SCALE FOR REFRIGERATORS.

1,139,522.

Specification of Letters Patent.

Patented May 18, 1915.

Application filed August 4, 1914. Serial No. 854,974.

*To all whom it may concern:*

Be it known that I, BERTIE M. HENLEY, a citizen of the United States, residing at Geddes, in the county of Charles Mix and State of South Dakota, have invented certain new and useful Improvements in Ice-Scales for Refrigerators; and I do hereby declare the following to be a full, clear, and exact description of the invention, such as will enable others skilled in the art to which it appertains to make and use the same.

This invention relates to refrigerator scales and has for its main object to provide a scale of this character with as few wearing parts as possible and of strong, durable mechanical construction.

With these and other objects in view, the invention consists in the improved construction, arrangement and combination of parts which will be hereinafter fully described and afterward specifically claimed.

In order that the construction and operation thereof may be readily comprehended, I have illustrated an approved embodiment of the invention in the accompanying drawings, in which, Figure 1 represents a view in side elevation of the upper part of a refrigerator showing the graduated beam of the scale on the outside. Fig. 2 represents a plan view of the scale mechanism, the table being removed. Fig. 3 represents a sectional view showing the interior mechanism of the scale. Fig. 4 represents a sectional view on a plane at a right angle to that of Fig. 3.

Wherever the same parts appear in a plurality of figures in the drawings, they are indicated by the same reference characters.

Referring to the drawings, 1 is a refrigerator having a cover 2 of ordinary construction pivoted thereto.

3 is a chain of ordinary construction attached to one side of the cover at one end and attached at the opposite end, as at 4, to a scale beam 5 rigidly mounted as at 6 on an operating shaft 7, which penetrates into and across the refrigerator. The beam 5 has a plurality of notches 8 along its upper edge and a graduated scale 9 along the side thereof. An adjustable weight 10, having an attaching hook 11 at the upper part thereof, is adapted to be hung in any of the notches 8, in the same manner as the ordinary scale weights are used.

Within the refrigerator 1 and near the sides thereof are arms 12 and 13 rigidly mounted upon the shaft 7. Near the end of each of said arms 12 and 13 is a transversely projecting pin 14, being parallel with the shaft 7.

To the rear of the shaft 7 and within the refrigerator a number of brackets 15 are attached to the opposite sides of a framework 16, said brackets having upturned ends 17, each of said brackets having a suitable aperture therethrough, through which a pivot pin 18 is mounted, and each end 17 having a notch in its upper edge as the other bearing for said pin 18. A pair of like brackets 19 is connected to the sides, near the front portion of the framework 16, said brackets likewise having pivot pins 20 mounted therein.

Balancing beams 21 are pivotally mounted upon the pivot pins 18, and balancing beams 22 are mounted upon the pivot pins 20. Said balancing beams are pivotally connected together near their inner ends by means of pivot pins 23 and play under and contact with the previously described pins 14 so that, upon the actuation of said balancing beams 21 and 22, said pins 14 are lifted, thereby lifting the arms 12 and 13 to turn the shaft 7, which in turn raises the scale beam 5. The exterior ends of each of said scale beams 21 and 22 are notched as at 24 to seat the ends of depending legs 25 as shown in Figs. 3 and 4 of the drawings. These legs 25 penetrate through suitable apertures in the parts 26 of the refrigerator shelf 27 and support thereupon an ice table 28 having the customary upturned flange edges 29.

A suitable drain 30 at one side of the refrigerator will receive the drippings from the ice table 28.

The framework 16 is supported from the walls of the refrigerator by brackets 32 on the outer sides of the framework which rest on brackets 33 secured to the inner sides of the refrigerator walls, the brackets being secured together by bolts 34.

In operation, the lid 2 of the refrigerator is raised, thereby pulling upon the chain 3, which lifts the scale beam 5 and turns the shaft 7. Upon turning the shaft 7, the arms 12 and 13 and the balancing beams 21 and 22, are raised, which allows the ice table 28 to descend and contact with lugs 27ᵃ on the shelf 27 through which the legs 25 pass, said shelf thereby receiving, through the lugs 27ᵃ, the impact of the ice when it is dropped upon the ice table 28. This automatically takes the pressure of the legs 25 off of the balancing beams 21 and 22 to thereby protect the said beams from heavy jars and undue strain or wear. When the lid is closed, thereby lowering the chain 3 which releases the scale beam, the weight of the ice 31 upon the table now depresses the balancing beams 21 and 22 by the pressure transmitted through the legs 25 at the notches 24, and said balancing beams raise said arms through the action of the pins 14 to thereby raise the scale beam 5. The weight 10 is then adjusted in the proper notch 8 to lower the scale beam 5 to balance the weight of the ice, and the scale 9 indicates the weight of the ice.

Having now described my invention what I claim as new and desire to secure by Letters Patent is:

1. A scale for refrigerators comprising a weighted scale beam, a shaft upon which the beam is mounted, balancing beams operatively connected with the scale beam by the shaft, a table mounted on the balancing beams and adapted to receive the ice to be weighed, and means including the scale beam, to relieve the balancing beams of the weight of the table and the ice thereon.

2. An ice scale for refrigerators comprising a shaft mounted in the refrigerator, one end of which projects therefrom, a scale beam rigidly secured upon the projecting end of the shaft, a weight adjustable on the beam, balancing beams, arms rigidly mounted upon the shaft, pins projecting from the arms in the path of movement of the balancing beams, an ice table mounted on the balancing beams, and a shelf between the table and the balancing beams to receive and support the table at the end of its downward movement.

3. An ice scale for refrigerators comprising a frame supported from the walls of the refrigerator, a shelf mounted above the frame, balancing beams mounted in the frame, an ice table having legs passing through the shelf and mounted upon the balancing beams, a shaft mounted in the frame, means upon the shaft to be actuated by the balancing beams when ice is placed upon the table, and a scale beam upon the shaft.

4. An ice scale for refrigerators comprising a frame secured to the walls of the refrigerator, brackets attached to the frame, pivot pins mounted in the brackets, balancing beams in pairs mounted on said pins and having notches in their upper edges near their outer ends, pivots connecting the inner ends of each pair of beams, a shaft mounted on the frame, arms rigidly secured on the shaft, pins projecting laterally from the arms in the path of movement of the beams, a scale beam mounted on the shaft, a weight on the scale beam and an ice support acting upon the balancing beams.

5. An ice scale for refrigerators comprising a frame mounted in the refrigerator, balancing beams pivotally mounted in the frame, an ice table mounted upon the balancing beams, means adapted to relieve the balancing beams of the pressure of the table, said means including a scale beam to indicate the amount of pressure, a shaft to which the scale beam is secured, and means connecting the shaft with the balancing beams to renew the pressure of the weight of the table upon the balancing beams when the scale beam is lowered.

In testimony whereof I have signed my name to this specification in the presence of two subscribing witnesses.

BERTIE M. HENLEY.

Witnesses:
W. C. KINSER,
A. L. SCHUSTER.